United States Patent
Chatterji et al.

(10) Patent No.: US 7,124,822 B2
(45) Date of Patent: Oct. 24, 2006

(54) FOAMED COMPLETION FLUIDS AND METHODS

(75) Inventors: Jiten Chatterji, Duncan, OK (US); Philip D. Nguyen, Duncan, OK (US); Karen L. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 71 days.

(21) Appl. No.: 10/979,901

(22) Filed: Nov. 2, 2004

(65) Prior Publication Data

US 2006/0090896 A1 May 4, 2006

(51) Int. Cl.
- E21B 43/04 (2006.01)
- E21B 43/25 (2006.01)
- E21B 37/00 (2006.01)

(52) U.S. Cl. ............... 166/278; 166/297; 166/309; 166/312; 166/381; 507/202; 507/244; 507/277; 507/925

(58) Field of Classification Search .......... 166/278, 166/297, 309, 312, 381; 507/202, 239, 244, 507/245, 277, 925
See application file for complete search history.

(56) References Cited

U.S. PATENT DOCUMENTS

| | | | |
|---|---|---|---|
| 4,436,156 A | 3/1984 | Fredrickson | 166/307 |
| 4,440,649 A | 4/1984 | Loftin et al. | |
| 4,444,668 A | 4/1984 | Walker et al. | |
| 4,536,297 A | 8/1985 | Loftin et al. | |
| 4,982,793 A | 1/1991 | Holtmyer et al. | 166/305.1 |
| 5,067,565 A | 11/1991 | Holtmyer et al. | 166/305.1 |
| 5,122,549 A | 6/1992 | Holtmyer et al. | 523/130 |
| 5,133,409 A * | 7/1992 | Bour et al. | 166/293 |
| 5,304,620 A | 4/1994 | Holtmyer et al. | 527/310 |
| 5,529,123 A | 6/1996 | Carpenter et al. | 166/293 |
| 5,565,416 A * | 10/1996 | Wu | 507/103 |
| 5,682,951 A | 11/1997 | Sydansk | 166/292 |
| 5,706,895 A | 1/1998 | Sydansk | 166/294 |
| 5,716,910 A | 2/1998 | Totten et al. | 507/102 |
| 5,851,960 A | 12/1998 | Totten et al. | 507/118 |
| 5,968,879 A * | 10/1999 | Onan et al. | 507/202 |
| 5,996,694 A | 12/1999 | Dewprashad et al. | 166/294 |
| 6,227,294 B1 * | 5/2001 | Chatterji et al. | 166/293 |
| 6,302,209 B1 | 10/2001 | Thompson, Sr. et al. | 166/305.1 |
| 6,668,927 B1 | 12/2003 | Chatterji et al. | 166/291 |
| 6,719,055 B1 | 4/2004 | Mese et al. | 166/308 |
| 6,734,146 B1 | 5/2004 | Chatterji et al. | 507/202 |
| 2002/0039984 A1 * | 4/2002 | Ketelson et al. | 510/247 |
| 2004/0168801 A1 | 9/2004 | Reddy et al. | 166/292 |
| 2004/0168830 A1 | 9/2004 | Reddy et al. | 175/65 |
| 2004/0182577 A1 | 9/2004 | Chatterji et al. | 166/305.1 |
| 2004/0200616 A1 | 10/2004 | Chatterji et al. | 166/267 |

* cited by examiner

*Primary Examiner*—George Suchfield
(74) *Attorney, Agent, or Firm*—Craig W. Roddy; Baker Botts L.L.P.

(57) ABSTRACT

Foamed completion fluids and methods of completing subterranean zones penetrated by well bores are disclosed. A method of completing a subterranean zone penetrated by a well bore comprises the steps of providing or preparing a foamed completion fluid comprising water, one or more salts, a gas and a capryl/capramidopropylbetaine surfactant foaming agent, introducing the foamed treating fluid into the subterranean zone, and then carrying out a completion operation in the subterranean zone.

15 Claims, No Drawings

FOAMED COMPLETION FLUIDS AND METHODS

BACKGROUND OF THE INVENTION

1. Field of the Invention

The present invention relates to foamed completion fluids and methods of completing subterranean zones utilizing the foamed completion fluids.

2. Description of the Prior Art

The completion process prepares a well for production and the fluids used at that stage of well construction are called "completion fluids." Initially, drilling fluids were used as completion fluids. Once perforating wells became a normal practice, it was found that using clean, solids-free brines for perforating increases well productivity. Well completion practices consisted of cementing casing, displacing the drilling fluid with a completion fluid and then perforating the well. Once the directional drilling evolved to horizontal and multilateral well designs and sand control in unconsolidated formations, the completion technology became more complex. As a result, specialized completion fluid technology has been developed and completion fluids are frequently used for perforating, forming gravel packs and other well operations such as the placement of tubing, packers, pumps and the like.

The aqueous completion fluids utilized are clean, relatively solids free, include one or more dissolved salts that provide weight to the completion fluids and do not react with the subterranean formation rock or hydrocarbons contained therein.

Completion fluids must also be compatible with formation clays to prevent clay swelling or deflocculating which causes the pore spaces in the subterranean formation to become blocked. Further, the completion fluids must be compatible with formation crude oil and natural gas so that oil-water emulsions are not formed which may produce formation damage.

The weight of an aqueous completion fluid can be adjusted by mixing one or more salts with the fluids, e.g., calcium chloride and calcium bromide. In order to prevent loss of the completion fluid, fluid loss control additives can be included in the completion fluids. Also, the rheology of a completion fluid can be controlled by the addition of friction reducers and/or lowering the viscosity of the completion fluid.

Thus, a completion fluid must be heavy enough to control formation pressure, be solids free, have minimum or no fluid loss to the producing formation and prevent damage to the formation.

While foamed completion fluids have been utilized heretofore, it has been difficult to form stable foamed completion fluids, particularly those completion fluids containing zinc bromide and other salts.

Thus, there is a need for foamed completion fluids formed of water, one or more salts, a gas and a foaming agent that are extremely stable.

SUMMARY OF THE INVENTION

The present invention provides improved foamed completion fluids which are extremely stable and methods of using the completion fluids which meet the needs described above and overcome the deficiencies of the prior art. The methods of the present invention for completing a subterranean zone penetrated by a well bore basically comprise the following steps. A foamed completion fluid is provided or prepared comprising water, one or more salts, a gas and a capryl/capramidopropylbetaine surfactant foaming agent. The foamed completion fluid is introduced into a subterranean zone, and thereafter a completion operation is carried out in the subterranean zone.

The completion operation carried out in the subterranean zone can include, but is not limited to, gravel packing the well bore, cleaning the well bore, placing tubing in the well bore, placing packers in the well bore, installing gravel pack assemblies in the well bore (sand control screen, crossover tool, wash pipe, packer, etc.) placing a pump in the well bore and the like.

A foamed heavy weight completion fluid of this invention basically comprises water, one or more salts, a gas and a capryl/capramidopropylbetaine surfactant foaming agent. The capryl/capramidopropylbetaine surfactant foaming agent produces an extremely stable foamed completion fluid which includes dissolved heavy salts. One or more salts can be utilized so that the foamed heavy weight completion fluid has the density required to prevent blowouts or the like.

The objects, features and advantages of the present invention will be readily apparent to those skilled in the art upon a reading of the description of preferred embodiments which follows.

DESCRIPTION OF PREFERRED EMBODIMENTS

As mentioned above, the methods of the present invention for completing a subterranean zone penetrated by a well bore include the following steps. A foamed heavy weight completion fluid of this invention is provided or prepared comprising water, one or more salts, a gas and a capryl/capramidopropylbetaine surfactant foaming agent. The foamed heavy weight completion fluid is introduced into a subterranean zone, and then a completion operation is carried out in the subterranean zone.

A foamed heavy weight completion fluid of this invention comprises water, one or more salts, a gas, and a capryl/capramidopropylbetaine surfactant foaming agent.

The water utilized in the foamed heavy weight completion fluid of this invention can be fresh water or salt water.

The one or more salts in the completion fluid for providing weight thereto include, but are not limited to, ammonium chloride, sodium chloride, sodium bromide, potassium chloride, calcium chloride, calcium bromide, zinc bromide, sodium formate, potassium formate, or cesium formate. The density of the brine at 70° F. can vary from about 9.4 lbs/gal when the salt dissolved in the water is ammonium chloride to about 20.5 lbs/gal when the salt dissolved in the water is a mixture of zinc bromide and calcium bromide. Preferred salts for use in the foamed completion fluids of this invention are calcium bromide, cesium formate, zinc bromide or a mixture of calcium bromide and zinc bromide.

The gas utilized in the foamed heavy weight completion fluid can be air or nitrogen with nitrogen being preferred. The gas utilized is generally present in the foamed heavy weight completion fluid in an amount in the range of from about 5% to about 90% by volume of water in the completion fluid.

The capryl/capramidopropylbetaine surfactant is environmentally benign, and as mentioned above, produces a very stable heavy weight brine foamed completion fluid which utilizes the salts described above. The capryl/capramidopropylbetaine surfactant foaming agent is included in the foamed heavy weight completion fluid of this invention in an amount in the range of from about 0.1% to about 10% by weight of water therein.

The completion operations that can be carried out in a subterranean zone utilizing the foamed heavy weight completion fluid of this invention include, but are not limited to, forming perforations in the well bore, gravel packing the well bore, cleaning the well bore, placing tubing in the well bore, placing packing in the well bore or placing a pump in the well bore.

The foamed completion fluid can include a fluid loss control additive to prevent loss of the completion fluid to permeable formations penetrated by the well bore.

Examples of fluid loss control additives that can be utilized include, but are not limited to, sized sodium chloride particles, sized calcium carbonate particles, oil soluble resins, self-degradable particulate such as polymers (as for example polylactic acid), hydroxyethylcellulose or crosslinked polymers. When used, the fluid loss control additive is present in the completion fluid in an amount in the range of from about 0.1% to about 1% by weight of water therein.

The completion fluid of this invention can also include a rheology control additive including, but not limited to, xanthan gum, whelan gum, hydroxyethylcellulose or copolymers of 2-acrylamido-2-methylpropane sulfonic acid. When used, the rheology control additive is present in the completion fluid in an amount in the range of from about 0.1% to about 5% by weight of water therein.

A method of this invention for completing a subterranean zone penetrated by a well bore comprises the steps of: (a) providing or preparing a foamed heavy weight completion fluid comprising water, one or more salts, a gas and a capryl/capramidopropylbetaine surfactant foaming agent; (b) introducing the foamed heavy weight completion fluid into the subterranean zone; and then (c) carrying out a completion operation in the subterranean zone.

A foamed completion fluid of this invention comprises: water; one or more salts; a gas; and a capryl/capramidopropylbetaine surfactant foaming agent.

In order to further illustrate the foamed completion fluids and methods of this invention, the following example is given.

EXAMPLE

A number of heavy weight salt solutions were prepared in the laboratory. The first solution contained calcium bromide salt, the second contained cesium formate salt and the third contained zinc bromide salt. The weight of the salt solutions varied from 14.2 lbs/gal to 19.2 lbs/gal. Two samples of each of the heavy weight salt solutions were foamed with capryl/capramidopropylbetaine surfactant in an amount of 5 gal per 1,000 gals of the salt solutions. The foam quality was measured by the following procedure:

Using a permanent marker, marks were placed on a 1 liter glass blender jar in increments of 100 mL up to 1,000 mL. 100 mL of each heavy weight salt solution was placed in the 1 liter wearing blender jar. The capryl/capramidopropylbetaine surfactant foaming agent was added to the wearing blender jar in an amount of 5 gals per 1,000 gals of the salt solution. The heavy weight salt solution and foaming agent were then mixed in the 1 liter wearing blender jar at a very low blender speed to give the foam sufficient time to build. The blender speed was then increased as the texture of the foam became finer, and the mixing was continued until the foam reached the maximum height in the blender jar. A timer was started and the foam was then poured into a 500 mL graduated cylinder. The maximum height the foam attained was recorded along with the volume so that the quality (percent gas) could be determined. Finally, the liquid that drained to the bottom of the graduated cylinder was monitored and the time was recorded when the volume reached 50 mL. The 50 mL volume is used to determine the half-life of the foam using the following formula. Foam quality equals the total foam volume minus the liquid volume divided by the total foam volume and multiplied by 100.

The half-lives and foam qualities of the three heavy weight salt solutions containing calcium bromide, cesium formate and zinc bromide at temperatures of 78° F. and 150° F. were determined. The results of these tests are set forth in the Table below.

TABLE 1

Half-Lives and Foam Qualities of Clear Completion Fluid

| Base Fluid | Fluid Weight (lb/gal) | Temp ° F. | Foaming Agent Concentration Per 1000 Gal | Quality | Half-Life (min:sec) |
|---|---|---|---|---|---|
| Calcium Bromide | 14.2 | 78 | 5 | 71 | 45:0 |
| Calcium Bromide | 14.2 | 150 | 5 | 74 | 20:00 |
| Cesium Formate | 19.2 | 78 | 5 | 63 | 18:00 |
| Cesium Formate | 19.2 | 150 | 5 | 69 | 12:00 |
| Zinc Bromide | 19.2 | 78 | 5 | 52 | 60:00 |
| Zinc Bromide | 19.2 | 150 | 5 | 47 | 12.00 |

From the Table, it can be seen that the heavy weight foamed completion fluids of this invention have excellent qualities and half-lives.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of completing a subterranean zone penetrated by a well bore comprising the steps of:
   providing or preparing a foamed completion fluid comprising water, one or more salts, a gas and a capryl/capramidopropylbetaine surfactant foaming agent;
   introducing the foamed completion fluid into the subterranean zone; and
   carrying out a completion operation in the subterranean zone.

2. The method of claim 1 wherein the water is fresh water or salt water.

3. The method of claim 1 wherein the one or more salts are selected from the group consisting of: ammonium chloride, sodium chloride, sodium bromide, potassium chloride, calcium chloride, calcium bromide, zinc bromide, sodium formate, potassium formate, and cesium formate.

4. The method of claim 1 wherein the one or more salts are selected from the group consisting of: calcium bromide, cesium formate, zinc bromide and a mixture of calcium bromide and zinc bromide.

5. The method of claim 1 wherein the one or more salts is present in the foamed completion fluid in an amount in the range of from about 9.4 lbs/gal to about 20.5 lbs/gal of water in the completion fluid.

6. The method of claim 1 wherein the gas is selected from the group consisting of: air and nitrogen.

7. The method of claim 1 wherein the gas is present in the foamed completion fluid in an amount in the range of from about 5% to about 90% by volume of water in the completion fluid.

8. The method of claim 1 wherein the capryl/capramidopropylbetaine surfactant foaming agent is present in the foamed completion fluid in an amount in the range of from about 0.1% to about 10% by weight of water therein.

9. The method of claim 1 wherein the completion operation carried out in the subterranean zone is selected from the group consisting of: forming perforations in the well bore, gravel packing the well bore, cleaning the well bore, placing tubing in the well bore, placing packing in the well bore, and placing a pump in the well bore.

10. The method of claim 1 which further comprises a fluid loss control additive.

11. The method of claim 10 wherein the fluid loss control additive is selected from the group consisting of: sized sodium chloride particles, sized calcium carbonate particles, oil soluble resins, hydroxyethylcellulose, and crosslinked polymers.

12. The method of claim 10 wherein the fluid loss control additive is present in the completion fluid in an amount in the range of from about 0.1% to about 1% by weight of water therein.

13. The method of claim 1 which further comprises a rheology control additive.

14. The method of claim 13 wherein the rheology control additive is selected from the group consisting of: xanthan gum, whelan gum, hydroxyethylcellulose and copolymers of 2-acrylamido-2-methylpropane sulfonic acid.

15. The method of claim 13 wherein the rheology control additive is present in the completion fluid in an amount in the range of from about 0.1% to about 5% by weight of water therein.

* * * * *